United States Patent [19]

Alldredge et al.

[11] 4,144,965

[45] Mar. 20, 1979

[54] FLEXIBLE CONVEYOR TRACK ASSEMBLY

[75] Inventors: Robert L. Alldredge, 130 Pearl St., Apt. 1108, Denver, Colo. 80203; Eduard W. VanLingen, 8732 West Fair Dr., Littleton, Colo. 80123

[73] Assignee: Robert L. Alldredge, Denver, Colo.

[21] Appl. No.: 832,575

[22] Filed: Sep. 12, 1977

[51] Int. Cl.² ............................................. B65G 41/00
[52] U.S. Cl. .................................... 198/831; 198/838; 198/862
[58] Field of Search .............. 198/860, 862, 864, 303, 198/831, 838; 193/35 F; 299/18, 19; 104/91, 172 S, 89, 126

[56] References Cited

U.S. PATENT DOCUMENTS

| | | | |
|---|---|---|---|
| 3,707,218 | 12/1972 | Payne | 198/862 X |
| 3,920,115 | 11/1975 | Craggs | 198/862 X |

*Primary Examiner*—Robert B. Reeves
*Assistant Examiner*—James L. Rowland

*Attorney, Agent, or Firm*—Kyle W. Rost

[57] ABSTRACT

A flexible conveyor track assembly has segmented rails forming upper and lower runs, with the segments having tongues and recesses aligned with respect to the direction of conveyor travel on the respective runs. The individual segments of each upper rail are joined to a segment of a lower rail by connecting plates, and laterally spaced resilient guide rods string together the connecting plates on each lateral side of the assembly and have rubber spring dampers between adjacent connecting plates to damp segment vibration. A series of pivotally connected, elongated links, each longer than a single rail segment, runs the length of the segmented rails to control the curvature of the assembly, each link being attached to a segment of each rail. In an alternative embodiment, the track assembly is hung from a monorail and the series of links is replaced with an external draw bar between monorail hangers at the opposite ends of the assembly.

14 Claims, 9 Drawing Figures

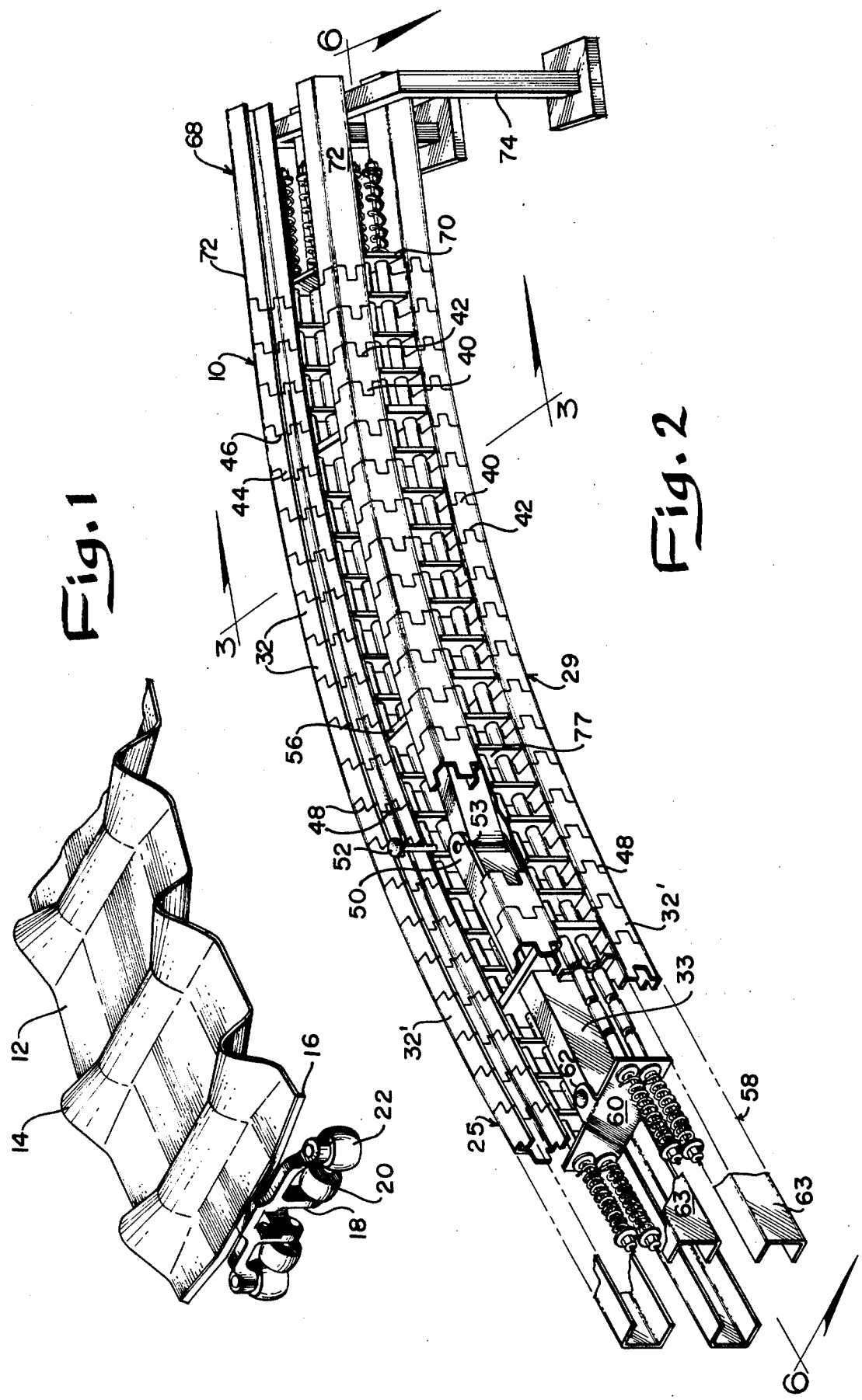

FLEXIBLE CONVEYOR TRACK ASSEMBLY

BACKGROUND OF THE INVENTION

1. Field of the Invention

The invention relates to power driven conveyors and, more specifically, to conveyors adapted to follow a curved path. The present invention relates to an improved track assembly that is flexible, offers superior lateral support to the conveyor, and forms a uniform curve when flexed.

2. Description of the Prior Art

Power driven conveyors are well known as endless belts driven by rollers or sprockets. In simplest form, the belt is flat and rides on rollers under the upper run, which supports the load. A problem with such a simple belt is that it is not suited to follow a curved path. Various types of flexible belt conveyors were developed to overcome this problem, including that disclosed in U.S. Pat. No. 2,701,050 to Steinborn, which teaches a trough-like belt having a series of load carrying compartments connected by yieldable channels and traveling along a support framework on rollers. Such a belt is suited to deform either vertically or horizontally and is able to carry shiftable loads on a longitudinal incline without the load sliding down the incline.

The Steinborn conveyor belt was designed to follow a track that defined the curved or inclined path of travel. Because conveyors of this type are often used in mining and quarrying operations, it is desirable to have a flexible track assembly that can be deformed as required to bring the conveyor near the work area, and it is similarly desirable to be able to deform the track to create discharge stations along the length of the conveyor. U.S. Pat. No. 3,169,631 to Knappe taught that the track or rails that provide the pathway for the belt rollers may be composed of a plurality of relatively short rail segments that are tiltable on an axis running in the longitudinal direction of the conveyor so that the rail may be deformed, especially to create a variable side discharge station by helically deforming the rail.

The concept of short rail segments is directly applied to curving support tracks in U.S. Pat. No. 3,707,218 to Payne et al., which discloses the use of a resilient rod along the center line of the track to orient the rail segments in a desired curve. A problem with this structure is that it provides relatively weak support to prevent the belt from tipping laterally while rounding a curve on the articulated rails segments. The shape of the resilient rod at the center of the track provides support to hold the segments in proper alignment, but under prolonged stress of heavy usage, wear on the rod can result in undesirable looseness in the segments of the track, allowing the conveyor to tip unnecessarily. This problem is especially serious in applications where the conveyor carries heavy loads such as coal or rock, as these loads may be placed on the conveyor in nonuniform fashion.

Another problem with prior art articulated guide rails is that they are a source of extreme noise when the belt is passing over the articulated sections, causing the sections to vibrate. In an enclosed environment such as a coal mine, the confined spaces and sound reflective walls intensify the problem. Prior art techniques of supporting the segments of articulated guide rails have never been successful damping the vibration between segments. The Payne et al. patent, for example, teaches the use of compression springs between segments on tie rods running the length of the conveyor, and also teaches the use of rubber spacer blocks between segment supports on a central resilient rod, but neither structure has been successful in damping intersegment vibration, nor is any such damping action alleged to reside in the Payne et al. structure.

SUMMARY OF THE INVENTION

A flexible conveyor track assembly has an upper and a lower run with each run having a track composed of articulated segments at the sides of the run. Laterally spaced connecting plates join the segments of the upper and lower tracks at each side of the runs, and the connecting plates are strung together by resilient guide rods at each side of the runs, the guiderods carrying vibration damping means between the connecting plates. A plurality of supporting links pivotally joined in a series run longitudinally in the central area between the upper and lower runs with each link being longer than a single track segment and being connected to one segment of each track to control the bending points of the assembly and act as a tension member between the ends of the sections of articulated track segments. The supporting links may be replaced with a single longitudinal draw bar located exteriorly of the track assembly between monorail hangers, in a modified embodiment offering superior performance under tension.

An important object of the invention is to create a flexible conveyor track assembly that bends uniformly through its flexible section. The supporting links create a series of chord-like lengths in the curved track section that assure uniform bending of the guide rods. The links are each connected to a segment of each track, and non-joined segments between the link-joined segments are free to form a curve in response to the bending between links. Similarly, guide rods that string together the connecting plates between upper and lower run tracks also run through the brackets that join track segments to the links. Therefore, the bending between links causes the guide rods to flex, with the link acting essentially as the chord of the arc formed in the guide rod.

Another important object is to damp the vibration that in the past has characterized flexible track conveyors. By locating the resilient guide rods in laterally spaced configuration, one guide rod approximately in the vertical plane through each track, it is possible to substantially eliminate vibration noise between track segments. The guide rods carry dampers between the segment connecting plates, and the dampers are deformable to accommodate the expansion and contraction in the track length as the assembly is curved.

A further important object is to reduce roller wear and further reduce noise in the flexible track section by aligning all track segments with interlocking tongues and groves directed with respect to the direction of conveyor belt movement. When a belt roller strikes the forward edge of a tongue, both noise and roller wear result. Therefore, all tongues that are likely to be struck by a roller are directed in the direction of belt travel.

BRIEF DESCRIPTION OF THE DRAWINGS

FIG. 1 is a perspective view of a conveyor belt adapted to follow a curved path, as is used in the present track assembly.

FIG. 2 is a perspective view in partial section showing the main parts of the flexible conveyor track assembly.

DESCRIPTION OF THE PREFERRED EMBODIMENT

Figure 3:
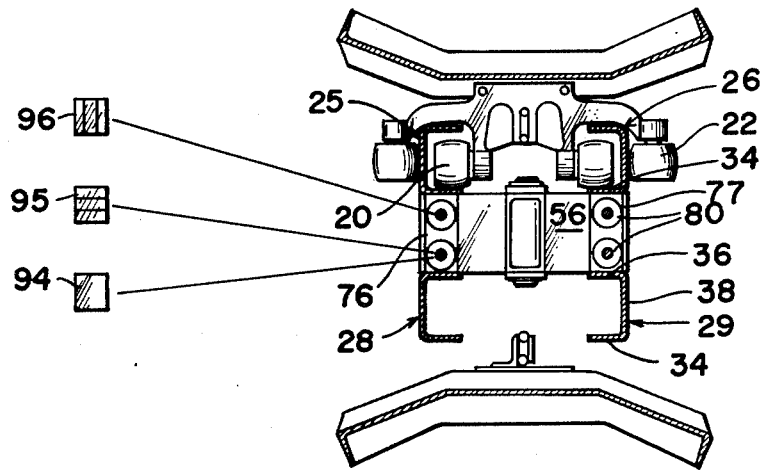
FIG. 3 is a cross-sectional view taken along the plane 3—3 of FIG. 2, with the conveyor belt shown on the tracks to illustrate the interaction of the two.

The flexible conveyor track assembly 10 of the present invention is primarily intended for use with a conveyor belt of the kind disclosed in U.S. Pat. No. 2,701,050 to Steinborn, or with any other suitable carrying means adapted to follow the curved configuration of the track assembly. One such suitable conveyor is illustrated in FIG. 1 to include a conveyor belt 12 having yieldable areas 14 at spaced distances along the length of the belt that allow the belt to deform while rounding a curved section in the conveyor understructure. Supporting yokes 16 connect the belt to carriage 18, which in turn is supported on the understructure by running rollers 20 that rotate on a substantially horizontal axis and by guide rollers 22 that rotate on a substantially vertical axis.

Conveyor belts of the type described operate on parallel tracks, with one track supporting each running roller 20 on a horizontal surface for longitudinal movement of the conveyor, and each track also has a vertical surface against which a guide roller 22 can act to maintain the axial alignment of the belt and carriage with the intended direction of conveyor travel. A pair of parallel tracks defines an upper run of the conveyor, over which the conveyor carries a cargo load, and another pair of parallel tracks defines a lower run over which the conveyor travels, generally in inverted position, while returning in a complete loop when an endless belt is used. The tracks may be supported by any manner of conventional brackets that do not interfere with the motion of the belt.

The present invention resides in the structure of a specialized section of track that preferably is used in conjunction with conventional straight sections of conveyor understructure, although an entire conveyor understructure could be constructed according to the present invention if circumstances so require. As shown in FIGS. 2 and 3, the track assembly includes a plurality of tracks corresponding in number and position to the tracks used in the conventional sections of conveyor understructure; for example, the upper run of the conveyor is defined by horizontally parallel tracks 25 and 26, and the lower run of the conveyor is defined by tracks horizontally parallel 28 and 29, each having a plurality of track segments 32 forming a section of the track length. The segments are supported through interlocking tongues, by a centrally located train of support links 33, and by a plurality of guide rods.

Each track segment 32 is substantially identical in shape and has a C-shaped cross section, as best shown in FIG. 3. The C-shape of the cross section provides a three sided channel enclosure for the running rollers 20 of the belt carriage 18, although the running rollers ordinarily ride only on the horizontal bottom flange 34 of the segment. Horizontal top flange 36 shields the interior of the segment from debris and prevents the running rollers from bouncing out of the track. Vertical side wall 38 completes the C-shape with flanges 34 and 36 and provides a contact surface for guide rollers 22.

Although the segments 32 are substantially identical in shape, the segments on upper run tracks 25 and 26 are arranged in the direction opposite of the segments in lower run tracks 28 and 29, in consideration of the opposite direction of conveyor carriage movement in the upper and lower runs, respectively. Each segment may be identified as having a forward edge facing in the general direction of conveyor belt travel and a rearward edge facing in the opposite direction, with the conveyor belt moving from right to left on the upper run of FIG. 2 and from left to right on the lower run. Each forward edge has a longitudinally extending tongue 40 near the center of vertical side 38, and each rearward edge has a correspondingly contoured recess 42 adapted to receive the tongue 40 from the segment adjacent to and rearwardly of the recess. Top and bottom flanges 34 and 36 each have a tongue 44 extending forwardly from the forward edge, preferably adjacent to the open side of the C-shape, and have a corresponding recess 46 in the rearward edge also for receiving the tongue 44 of an adjacent segment.

It should be noted in FIG. 3 that running rollers 20 ride on flanges 34 near the open side of the C-shape, while guide rollers 22 contact vertical side 38 near its center. With segments 32 of the described configuration, the rollers 20, 22 will at all times travel from the tongues 40, 44 on to the main body of each segment and will never strike a tongue on its forward edge. When the track assembly 10 is perfectly straight, the various tongues and recesses will mesh perfectly and form a smooth path on which the rollers 20, 22 can operate. However, when the assembly 10 is curved, the tongues and recesses are no longer in perfect alignment. Some tongues may protrude slightly into the roller path established by a series of segments. In this case, the rollers will travel over the protruding tongue and onto the main body of the next segment without striking either the forward edge of the tongue or the rearward edge of the corresponding recess in the next segment. The rollers as shown in FIG. 3 are aligned to contact the segments substantially in the paths of the tongues and therefore the positions of the tongues and recesses could be altered for a different relative positioning of the rollers to maintain the tongues in the path of the rollers.

When the assembly 10 is curved, some tongues may extend slightly outside the roller path established by a series of segments 32. In this case, the rollers will be guided from one segment to the next by the longitudinal margins 48 of each recess and by the tongues. The rollers 20, 22 are barrel shaped, as shown in FIGS. 1 and 3, and roll substantially on the centers of the curved barrel sides. These centers can ride on the tongues slightly outside the plane of the main roller path, while the remainder of the barrel side engages the margins 48 of the corresponding recess in the next segment to ease the transition between adjacent segments. Thus, by arranging the segments 32 with their tongues in the path of roller travel and extending forwardly in both upper and lower runs, the apparatus 10 allows conveyor carriage movement through curves with substantially less resistance than is known in prior art curved track sections, and the rollers accordingly are subject to less wear.

The contour of assembly 10 is adjustable and may be straight or curved. Support links 33 are fastened to the rails 25, 26, 28, and 29 at selected locations to hold the rails in proper relative position to carry carriage 18 and also to control the curvature of assembly 10. Each link 33 may be pivotally attached at each of its longitudinal ends to another link, for example by a clevis 50 formed at a first end of each link that is connected by a pivot pin 52 through a hole 53 in a nose at the opposite end of an adjacent link. Each link is rigid enough to resist bending along its length, although the links may freely pivot about pin 52 at their union.

Figure 6:
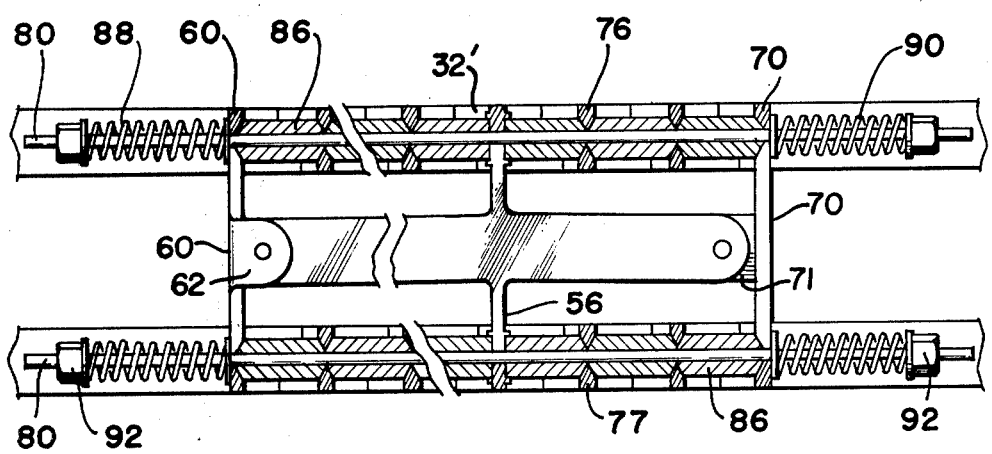
FIG. 6 is a cross-sectional view taken along the plane of line 6—6 of FIG. 2, showing the structure of the support links and guide rods.

Each link provides structural support to hold the tracks in proper relative position through an attaching bracket 56 connecting the link 33 to a segment 32 designated as 32' in each of the rails. A single bracket 56 may be welded to link 33 at a point in its length, for example at the midpoint of the link, and also be welded to one segment 32' of each track, as shown in FIG. 6, establishing a rigid plane normal to the lengthwise axis of the link and containing one segment of each track per link. The preferred length of each link is in excess of the length of a segment, so that a plurality of nonattached segments 32 forms each track between the segments 32' connected to adjacent links. For example, each link may be two feet in length with bracket 56 at the midpoint of the link, and seven track segments 32 in each rail may parallel the length of the link, including the central segment 32' attached to the bracket 56, as shown in FIG. 2. Thus, assembly 10 may have four links 33 supporting the segmented portion of the tracks, with twenty-eight track segments 33 forming the curvable portion of each track. Of these twenty-eight segments, four are supported by the four links 33 and the remaining segments are at least partially supported by the system of interlocking tongues and recesses previously described.

The terminal ends of assembly 10 provide a transition area between the segmented portion of the tracks and the adjoining conveyor understructure, which may be another assembly 10 or a section of conventional straight rails. On the lefthand edge of the assembly in FIG. 2, here referred to as the forward edge in conformity with the direction of conveyor travel on the upper run, is adapter 58 consisting of a centrally located union plate 60 having a clevis 62 mounted to be pivotally joined to hole 53 on the forward facing end of the forwardmost link 33, as previously described for interlink unions. Plate 60 is connected to elongated portions of straight track 63 forming the terminal end of each track 25, 26, 28, and 29. The end of each track portion 63 adjacent a segment 32 is contoured with appropriate tongues and recesses to mate with the corresponding tongues and recesses of the segment. The end of each portion 63 opposite from the segments 32 may be squarely terminated to have any other suitable shape or attaching means for connecting to a neighboring section of conveyor understructure.

On the righthand end of assembly 10 of FIG. 2, referred to as the rearward end, is adapter 68, which is similar in form and function to adapter 58 except that its union plate 70 is configured with a nose 71 adapted to be engaged by the clevis at the rearward end of the rearwardmost link 33. Straight track portions 72 mate with segments 32 at one end and mate with a neighboring section of understructure on the other end and are joined to plate 70.

Adapter sections 58 and 68 are the preferred mounting points for supporting framework, for example legs 74. The exact configuration of the framework may be altered for different situations, but suggested modifications include the use of an overhead monorail carrying the framework, or rollers on legs 74 to supply mobile support to assembly 10 or to the entire conveyor.

When assembly 10 is to be curved, the ends of links 33 provide discrete points at which the curvature will occur. For example, if four links 33 plus two adapter sections 58 and 68 define the length of assembly 10, the axes of these six units will define five intermediate angles separated by the length of a link 33 from one another and by the length of an adapter section from neighboring portions of the conveyor understructure.

The segments 32 intermediate segments 32' require support in addition to the interlocking system of tongues and recesses previously described. For this purpose, connecting means such as weldments may be used between corresponding segments in parallel tracks. In the embodiment of FIG. 3, a weldment 76, 77 connects one rail of the upper run to one rail of the lower run in vertical relationship, there being no horizontal joining means between the segments of the same run except brackets 56 on links 33 joining segments 32'. Thus, corresponding segments 32 of rails 25 and 28 are joined by common weldments 76, and corresponding segments of rails 26 and 29 are similarly joined by weldments 77. Weldments 76 and 77 are spaced on opposite sides of links 33, preferably at the outer sides of the upper and lower runs.

Guide rods 80 run through weldments 76 and 77, stringing the respective weldments between end adapters 58 and 68, where the guide rods are mounted. In the embodiment of FIG. 3, a plurality of guide rods, for example two, runs through each weldment, the rods being parallel in a vertical plane. This arrangement of rods in a vertical plane preferably includes the path supporting the running rollers 20 of the belt carriage to provide exceptional vertical support to the conveyor and to resist tipping if the load on the conveyor should be unbalanced.

Figure 5:
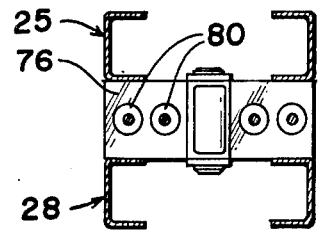
FIG. 5 is a cross-sectional view similar to FIG. 3, showing a second modified structure for the track assembly.

An alternative embodiment shown in FIG. 5 would connect the upper and lower runs as has been described with weldments 76, 77, but the guide rods running through each weldment are in a horizontal plane, providing excellent horizontal support. The choice between vertical or horizontal alignment of the guide rods may be made according to the direction of curvature, amount of curvature, and intended conveyor load for each application of apparatus 10. Vertical alignment is preferred to provide the best support for heavy conveyor loads and relatively sharp curves, while horizontal alignment is preferred for curves of relatively larger radius.

Figure 4:
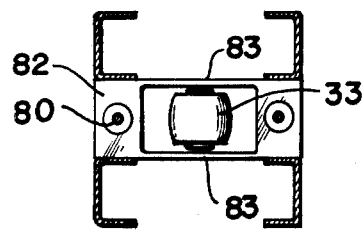
FIG. 4 is a cross-sectional view similar to FIG. 3, showing a modified structure for the track assembly.

Another modified form is shown in FIG. 4 to provide exceptional rigidity in both vertical and horizontal directions while using only a single guide rod 80 at each side of the apparatus 10. The shape of the weldment has been altered to include both a vertical plate 82 between the respective tracks at the sides of the top and bottom runs, as above, and connecting members 83 running between the weldments to form a rectangular frame having a hollow center through which run links 33.

The mounting of the guide rods 80 in assembly 10 provides for expansion and contraction of the track assembly as it is pulled through a curve. Since links 33 have little ability to expand or contract as they are pivoted into a curved configuration, the track on the inner radius of the curve must contract while the outer track expands. As best shown in FIG. 6, guide rods 80 carry rubber spring dampers 86 between each weldment 76 or 77 and between the union plates 60, 70 and the adjacent weldments. Each damper 86 is longer that the distance between adjacent segments 32 when the damper is in undeformed configuration, and its ends are abutting weldments 76. Track segments 32 are tensioned on guide rod 80 by resilient means such as compression springs 88 and 90 mounted on the extremities of the guide rods and against the outer end surfaces of union plates 60 and 70, respectively. The compression springs 88, 90 are retained on the guide rod ends by any retaining means such as adjustable nuts 92 threaded to the rod ends. Adjustable retaining means such as nuts 92 allow alteration of the effective length of the rods.

Dampers 86 cushion each segment 32 against vibration commonly caused by the rollers of the belt carriage passing through assembly 10. Accordingly, the dampers are of sufficient length that they may be slightly compressed even when located between the outer tracks when the assembly is bent at its maximum curvature, creating maximum expansion in the outer tracks. The inner tracks of the curve limit the degree of curvature when the segments are tightly abutting, but the dampers between the inner tracks will resiliently deform to prevent vibration of these segments when the assembly is not bent to the maximum curvature.

Compression springs 88, 90 may be adjusted by nuts 92 to fix the spacing between segments 32. Ordinarily, the springs automatically adjust the length of the guide rods between union plates 60, 70, but nuts 92 may be tightened or loosened as necessary if additional adjustment is desired. For example, it may be desirable to tighten the rod on the inside radius of a curve to hold the track assembly 10 tightly in that configuration. However, the main purpose of using a flexible track assembly is to be able to relocate the conveyor as required, and for the purpose it is desirable that the flexible section of track be curvable without any mechanical adjustment.

Guide rods 80 flex between union plates 60 and 70 when the track assembly is pulled into a curved configuration. The location of the flexing is influenced by union plates 60 and 70, and also by the position of brackets 56, which are mounted on links 33. The guide rods run through portions of brackets 56 that are between successive weldments 76, 77, and therefore the arc of each rod 80 is a series of smaller arcs, each having either a union plate or a bracket 56 marking its ends. The rods 80 tend to bend with improved uniformity when the flexing of the rod is controlled by intermediate support means such as spaced brackets 56 between the union plates, as contrasted to the flexing of the rod without intermediate support means. One of the factors influencing the uniformity of the arc is the distance between successive supports, as the distance between adjacent brackets 56 or between a union plate and the first bracket 56, with the degree of rod flexing being directly related to the effective length of the rod between the appropriate supports. Therefore, particularly in assemblies 10 having few support links 33, for example two, the brackets 56 may be moved to a position closer to the central union between the links 33, making the distance between the two brackets 56 more nearly equal to the distance between each union plate and the closest bracket.

One configuration that has been found to produce surprising flexibility places bracket 56 exactly at the pivot point between connected links, the bracket being connected, for example, to the nose end of each link. Such a configuration is further enchanced by extending the length of clevis 62 located on union plate 60 to be several segments 32 in length, for example, to make the distance between the union plate and the first bracket 56 equal to the distance between successive brackets. Nose 71 on union plate 70 may be similarly extended and carry a bracket 56 at its end, or nose 71 may be retained as a relatively short member, as illustrated in FIG. 6. Other spacing arrangements between the brackets and the union plates could be used to tailor the bending characteristics of the assembly as desired.

The guide rods may have various shapes and constructions that influence their flexibility. As shown in FIG. 3, the rods 80 are round in their preferred form, but square rods 94 could also be used. Similarly, the rods may have horizontal laminations 95 or vertical laminations 96.

Figure 7:
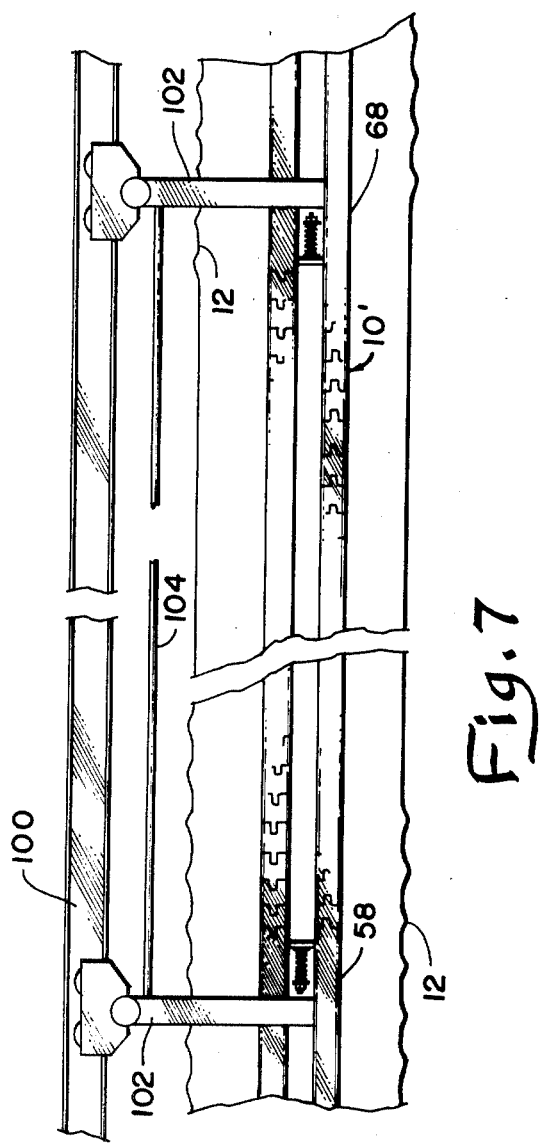
FIG. 7 is a side elevational view of a modified embodiment of the invention, with the conveyor belt shown diagrammatically.
Figure 8:
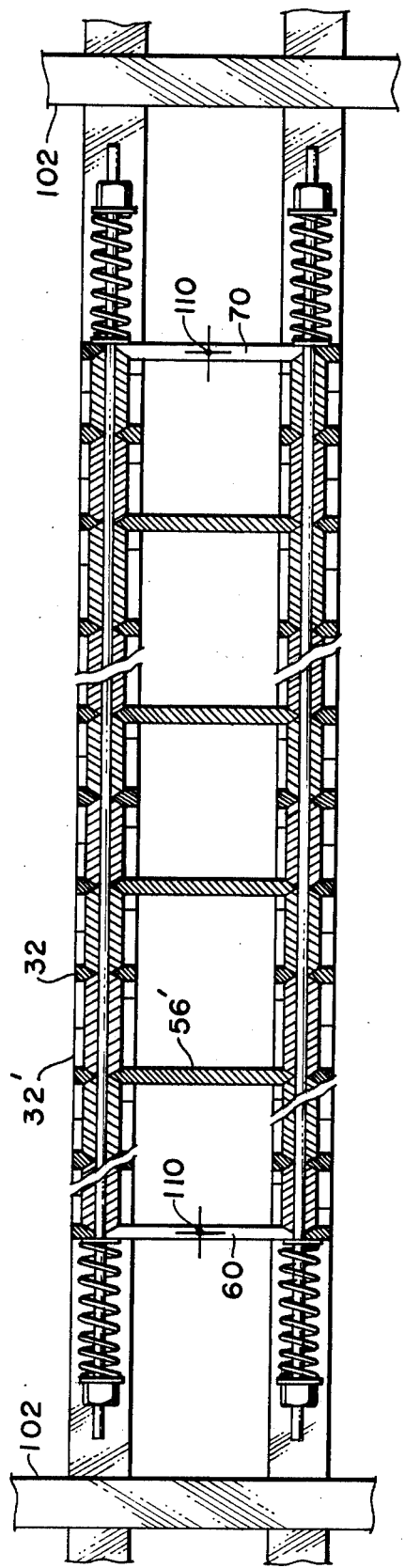
FIG. 8 is a cross-sectional view of the embodiment of FIG. 7, similar to FIG. 6.

In a special variation of the track assembly 10' illustrated in FIG. 7, the entire assembly is suspended from a monorail track 100 by monorail hangers 102 attached to adapter sections 58 and 68. Links 33 are eliminated from the center of the track assembly, but brackets 56', FIG. 8, are now attached to segments 32' in each track without a link 33 being present as a part of the bracket. The bracket 56' may be used with increased frequency as compared to brackets 56 of the prior embodiment. For example, where brackets 56 were attached to every seventh track segment, brackets 56' may be attached at every other segment of each track, as shown in FIG. 8.

Figure 9:
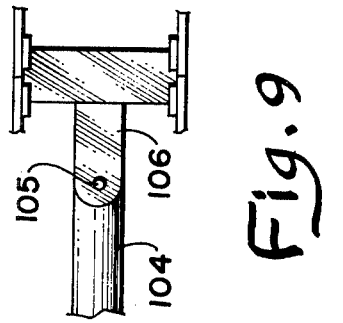
FIG. 9 is a top plan view of one monorail hanger, showing the pivotal connection of the draw bar.

In the prior embodiment 10, the links 33 served in part as tensioning members that held the track segments 32 together as the assembly 10 was pulled through curves or transported linearly. In the embodiment 10', this tensioning function is assumed by a draw bar 104 running between monorail hangers 102 and pivotally connected to each hanger, for example by a vertical pivot pin 105, FIG. 9, joining a nose 106 at each end of the draw bar to a clevis on the monorail hanger 102, similar to the described connection between union plate 60 and the adjacent link 33 shown in FIG. 6. The pivotal connection between the draw bar and the monorail hanger allows relative pivotal motion at least in a horizontal plane, so that the hangers can pivot on a vertical axis with respect to one-another as the track section 10' curves to follow non-linear portions of the monorail track 100.

The monorail hangers are connected to adapter sections 58 and 68 and may be joined to the draw bar at any point exterior of the assembly 10' where the bar will not interfere with the path of the conveyor belt 12 traveling on the track. The preferred location for the draw bar is directly over the center line of the track assembly and close to the mounting of the hangers to the monorail track 100, as shown in FIG. 7. The vertical distance between the draw bar and the track section allows the flexible track to deflect into a curved configuration as required with a minimum of interference from the straight draw bar. In fact, it has been discovered that the tracks can flex into a curve between the hangers without substantially altering the linear length of the section 10'. This result is achieved both because of small amounts of play between the various parts of the track assembly and because rubber spring dampers 86 allow a certain amount of stretch or compression in the flexible tracks. As a result, the assembly 10' is compatable with a draw bar 104 of fixed length regardless of whether the track assembly is straight or curved. It is preferred that the vertical axis through the pivot pin 105 between the draw bar and the hanger bracket at each end of assembly 10' pass through the vertical center line of the union plate 60 or 70 at that respective end of the assembly, indicated as point 110 in FIG. 8.

We claim:

1. In a conveyor of the type having a belt adapted to follow a curved path and mounted on rollers, an improved flexible track assembly of the kind having a pair of segmented track portions forming an upper and a lower run for the conveyor, the tracks of each run being horizontally spaced and the runs being vertically spaced with each track of the upper run being approximately vertically aligned with a track of the lower run, the tracks defining an elongated central area running the length of the assembly, wherein the improvement comprises:

(a) a series of pivotally connected links running through said elongated central area for substantially the length of the segmented track portions, each link being joined to a segment of each track and having a length in excess of the length of a track segment to provide controlled bending of a length of each track composed of a plurality of track segments through pivotal bending between links;

(b) means connecting each segment of each upper run track with a segment of the respective vertically aligned lower run track;

(c) resilient guide rods passing through said connecting means between the vertically aligned tracks to laterally support the tracks of the upper and lower runs against relative vertical deflection; and (d) mounting means at the opposite ends of said track assembly for engaging the respective ends of said series of links and for carrying the ends of said guide rods, the guide rod ends passing through said mounting means and having retaining means for fixing the effective length of the guide rods on at least one end of each rod.

2. The flexible track assembly of claim 1, wherein said segmented track portions are of the kind having plurality of individual track segments keyed together by tongues and recesses, the tongue of one segment fitting closely into a recess of the adjoining edge of an adjacent segment, wherein the improvement further comprises each segment having a forwardly extending tongue in the approximate path of said rollers carrying the conveyor belt and extending in the direction of normal conveyor belt movement in the respective upper or lower run, and having a recess in the segment edge opposing the direction of normal conveyor belt travel in the normal path of conveyor belt travel for receiving said forwardly extending tongue, the alignment of the forwardly extending tongues with the direction of belt travel extending roller life by preventing said rollers from striking the forward edge of a tongue.

3. The flexible track assembly of claim 1, wherein each track segment is substantially identical in length and each of said links is identical in length and is joined to a segment in each track near the midpoint of the link's length, the pivotal connection between links producing uniform curvature of the track between segments of each track joined to adjacent links.

4. The flexible track assembly of claim 1 further comprising a rubber spring damper on said guide rods between each segment connecting means to space track segments and damp vibration between segments caused by conveyor belt rollers traveling over said track segments.

5. The flexible track assembly of claim 1, further comprising resilient means on an end of each guide rod exterior of said mounting means but interior of said retaining means for exerting pressure on the mounting means and for allowing the track assembly to be flexed into a curved configuration with automatic increase in the length of the guide rod between the mounting means in the outer radius of the curve, and automatic decrease in the length of the guide rod between the end mounting means on the inner radius of the curve.

6. The flexible track assembly of claim 5, wherein said retaining means on the guide rods is located exteriorly of said resilient means, the retaining means being adjustable in position along the length of the rods for altering the pressure exerted against the mounting means to fix an achieved degree of curvature in the track assembly.

7. The flexible track assembly of claim 1, wherein said connecting means between segments of each pair of vertically aligned tracks are joined by a pair of vertically spaced parallel guide rods providing lateral support directly in the plane of the belt roller path on the tracks.

8. The flexible track assembly of claim 1, wherein said connecting means between segments of each pair of vertically aligned tracks are joined by a pair of horizontally spaced guide rods providing support against lateral displacement of the tracks.

9. The flexible track assembly of claim 1, wherein said laterally spaced connecting means between pairs of vertically aligned tracks are connected by pairs of horizontal cross members, one member of each pair passing below said series of links and one member passing above the series of links, and wherein a guide rod passes through the connecting means in the plane of the vertically aligned tracks.

10. The flexible track assembly of claim 1, wherein each of said links is joined to a segment in each track near one end of each link.

11. The flexible track assembly of claim 1, wherein said mounting means further comprises a union plate connected to a terminal portion of each track at the opposite ends of the assembly, the union plate at each end of the assembly having a connecting member for pivotally attaching one end of a link to the union plate.

12. The flexible track assembly of claim 11, wherein said connecting member on a union plate extends longitudinally through a portion of said elongated central area in excess of the length of a single track segment to improve the uniformity of curvature through the length of said segmented track portions.

13. In a conveyor of the type having a belt adapted to follow a curved path and mounted on rollers that follow a track, an improved flexible track assembly of the kind having segmented lengths of track arranged in upper and lower pairs forming, respectively, upper and lower runs for the conveyor, the tracks of each run being horizontally spaced and the runs being vertically aligned, the tracks defining an elongated central area running the length of the assembly, the entire assembly being suspended from a monorail track by a monorail hanger near each end of the assembly, wherein the improvement comprises:

(a) a draw bar pivotally connected at each end to said monorail hangers at a point spaced from said central area for tensioning the segmented lengths of track while allowing the segmented portions to curve in response to the configuration of the path established by the monorail track;

(b) an adapter section at each end of the assembly having a non-segmented length of track terminating the segmented lengths of track, and a union plate joining together each of the non-segmented lengths of track at each end of the assembly, the adapter sections being directly connected to the monorail hangers;

(c) a connecting plate joining a segment of each upper run track of the assembly with a segment of the vertically aligned lower run track for holding the tracks at a fixed vertical spacing;

(d) a transverse connecting bracket joining a segment of each track on one lateral side of the assembly with a segment of each track on the opposited lateral side of the conveyor, the bracket holding a segment of each track in fixed relative spacing;

(e) each segment of each of said tracks being attached to a connecting plate or a connecting bracket;

(f) a pair of resilient rods spaced at opposite lateral sides of the assembly and running through said union plates, connecting plates and connecting brackets;

(g) means resiliently retaining the ends of said rods in a position extending longitudinally beyond said union plates, the length of the rods between the union plates being variable according to the force applied to said resilient retaining means;

(h) rubber spring dampers carried by said rods and located in spaces defined by the union plates, connecting plates, and connecting brackets along the length of the rods, each damper having an undeformed length greater than said space for holding the segments in gapped relationship and allowing the assembly to curve without deforming said draw bar.

14. The track assembly of claim 13, wherein said draw bar is a non-segmented linear member and said pivotal connections to the monorail hangers have a vertical pivot axis passing through the union plate of the adapter section to which the respective monorail hanger is attached, and wherein said union plate is joined to the non-segmented lengths of track at a point substantially adjacent to the segmented lengths of track.

* * * * *